United States Patent [19]

Kruse et al.

[11] Patent Number: 5,413,187
[45] Date of Patent: May 9, 1995

[54] PERSONAL MOBILITY VEHICLE

[75] Inventors: Thomas E. Kruse; John C. Traxler, both of Sarasota, Fla.

[73] Assignee: Sunstate Mobility Corp., Sarasota, Fla.

[21] Appl. No.: 150,409

[22] Filed: Nov. 10, 1993

[51] Int. Cl.⁶ .............................................. B60K 17/30
[52] U.S. Cl. .................................. 180/65.1; 180/6.28; 180/79.1
[58] Field of Search .................... 180/65.1, 65.5, 65.6, 180/6.2, 6.24, 6.44, 907, 6.28, 79.1

[56] References Cited

U.S. PATENT DOCUMENTS

| | | | |
|---|---|---|---|
| 4,431,076 | 2/1984 | Simpson | 180/907 |
| 4,613,151 | 9/1988 | Kielczewski | 180/907 |
| 4,953,645 | 9/1990 | Korber et al. | 180/65.1 |
| 5,183,133 | 2/1993 | Kog et al. | 180/907 |

*Primary Examiner*—Richard M. Camby
*Attorney, Agent, or Firm*—Charles J. Prescott

[57] ABSTRACT

A personal mobility vehicle having a very low center of gravity and compact overall size which facilitates travel in narrow hallways and in negotiating sharp turns both indoors and out of doors on smooth and uneven surfaces. The vehicle includes a generally horizontally disposed frame supported in close proximity above the ground by a steerable, motor-driven rear wheel and two spaced front wheels. A battery arrangement is connected to and supported by the frame and operably connected between a control lever in electrical communication with an electronic circuit and the motors for propelling and steering the rear wheel. A seat is provided whereby a user's feet may be comfortably supported on the frame. An arcuate cushioning ring connected and extending radially from the perimeter of the frame fixed objects such as walls, doorways and the like to facilitate tight maneuvers. Outrigger type anti-scuff and anti-tip wheels are also provided and may be in combination with a forwardly positioned ramp assist wheel connected beneath a forwardly perimeter of the frame to assist the vehicle in travelling over a ramp or bump.

6 Claims, 3 Drawing Sheets

PERSONAL MOBILITY VEHICLE

SCOPE OF THE INVENTION

This invention relates generally to self-propelled personal mobility vehicles for the handicapped and physically impaired, and more particularly to a compact, low center-of-gravity personal mobility vehicle which is uniquely adapted to be highly maneuverable in tight places and over various types of terrains.

PRIOR ART

Presently, a broad array of self-propelled personal mobility vehicles for use by the handicapped and physically impaired are either patented and/or marketed. These vehicles are almost exclusively motorized and battery powered and consist of either three or four ground engaging wheels. However, the three wheeled tricycle-type version appears most popular. The drive arrangement may include a propulsion motor operably connected to either one or both of the rear drive wheels or incorporated into a front steerable wheel.

Typically, these available and/or known personal mobility vehicles are relatively massive in structure, some of which are also designed for outdoor operation in grass and dirt. Additionally, the center of gravity of the user seated atop such available vehicles is relatively high, producing somewhat compromised stability.

In the typical front wheel steering vehicle, a steering tiller is incorporated to be manually operated by the rider. As a result, these vehicles are relatively long to accommodate the steering tiller and must be entered from the side to get behind the tiller. Such vehicles also prohibit driving up to and under a table due to the presence of the steering tiller in the front of the vehicle.

A number of patented prior art device listed herebelow include a steerable rear wheel in combination with spaced front wheels for a wide range of vehicles. However, none discloses a personal mobility vehicle for transporting a person which includes the maneuverability and structural features of the present invention.

|           |              |
|-----------|--------------|
| 2,482,203 | Peterson, et al. |
| 2,586,273 | Steven       |
| 2,644,540 | Balzer       |
| 3,110,352 | McClarnon    |
| 3,137,869 | Johnson      |
| 3,566,986 | Udden        |
| 5,121,806 | Johnson      |

A further limitation of personal mobility vehicles presently known to applicant resides in the limited ability of these larger vehicles to negotiate narrow hallways, to avoid running over the toes of others nearby on foot, and to be able to maneuver in dimensionally tight environments.

One prior art device which overcomes this limitation is disclosed in applicants' previous U.S. Pat. No. 5,249,636. This invention, however, is extremely compact and is best suited primarily for indoor use and on paved surfaces.

The present invention provides a very maneuverable, low center of gravity personal mobility vehicle which, in the preferred embodiment, will easily maneuver down narrow hallways, through narrow doorways at 90 degrees to such hallway, and into other dimensionally tight situations. A unique electronically controlled rear steerable propelling wheel arrangement is also provided, thus eliminating the front tiller. This invention also reduces the likelihood of running over the foot of an able bodied pedestrian who may inadvertently get too close to the vehicle while underway.

BRIEF SUMMARY OF THE INVENTION

This invention is directed to a personal mobility vehicle having a very low center of gravity and compact overall size which facilitates travel in narrow hallways and in negotiating sharp turns as into a doorway along a narrow hall. The vehicle includes a generally horizontally disposed frame supported in close proximity above the ground by a steerable, motor-driven rear wheel and two spaced front wheels. A battery arrangement is connected to and supported by the frame and operably connected between a control lever in electrical communication with an electronic circuit and the motors for propelling and steering the rear wheel. A seat is provided whereby a user's feet may be comfortably supported on the frame. An arcuate cushioning ring connected and extending radially from the perimeter of the frame, contacts fixed objects such as walls, doorways and the like to facilitate tight maneuvers. Outrigger type anti-scuff and anti-tip wheels are also provided and may be in combination with a forwardly positioned ramp assist wheel connected beneath a forwardly perimeter of the frame to assist the vehicle in travelling over a ramp or bump.

It is therefore an object of this invention to provide a self-propelled personal mobility vehicle for transporting an individual which is extremely compact in size and maneuverable in tight quarters.

It is another object of this invention to provide such a personal mobility vehicle which provides easy frontal access to the seat area and also has a very low center of gravity and improved lateral stability.

And yet another object of this invention is to provide a personal mobility vehicle having a unique rear steerable propelling wheel which greatly enhances maneuverability and compactness.

It is yet another object of the present invention to provide an extremely maneuverable personal mobility vehicle which is readily adapted for outdoor use and easily able to negotiate over ramps and bumps while maintaining a very low profile and center of gravity.

In accordance with these and other objects which will become apparent hereinafter, the instant invention will now be described with reference to the accompanying drawings.

DETAILED DESCRIPTION

Figure 1:
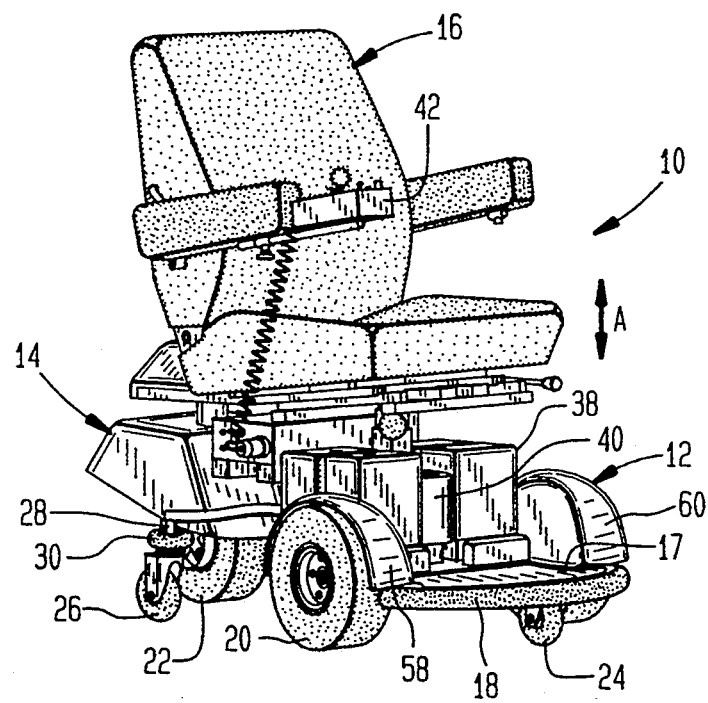
FIG. 1 is a front right perspective view of the invention.
Figure 2:
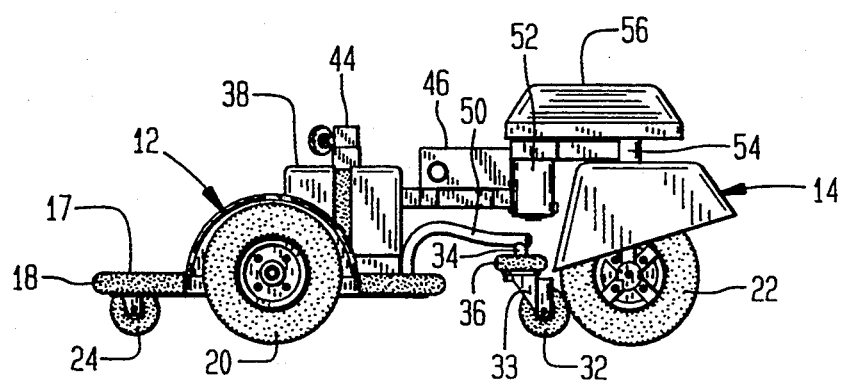
FIG. 2 is a left side elevation view of the invention shown in FIG. 1 with the seat removed.

The detailed description and disclosure, including drawings, of applicants' prior invention as disclosed in U.S. Pat. No. 5,249,636 ('636) is incorporated herein in its entirety by this reference and made a part hereof. All reference numerals herebelow, however, refer to the present invention as it is shown in the FIGS. 1 to 6 in this present application.

Referring now to the drawings, particularly to FIGS. 1 to 4, the invention is shown generally at numeral 10 and includes a frame assembly 12, a motor driven steerable rear wheel assembly 14, and a seat assembly 16 which is rigidly connected and upwardly extending from the frame assembly 12.

The frame 12 includes two symmetrically spaced apart front wheels 20 positioned forwardly of, and somewhat astride a support pedestal 44 of seat 16 and supporting a storage battery 38. Front wheels 20 are rigidly mounted for free rotation to frame 12 about a transverse axis. Frame 12 is cooperatively structured with seat 16 so that a user's feet being transported by the vehicle 10 may comfortably rest atop plastic or fiberglass molded surface 17 without the need for additional foot support structure.

Secured around the generally circular frame 12 is a fixed cushion ring or arcuate bumper 18 which is disposed generally about the horizontal perimeter of the frame 12. This cushioning ring 18 is provided to prevent damage to walls structures which the vehicle 10 might encounter. Frame 12 also includes right and left molded fenders 58 and 60 which substantially surround front wheels 20 to prevent foot contact with the front wheels 20. Note that the outer surfaces of front wheels 20 are generally tangent with the outer preimeter of the sides of frame 12 to enhance compactness.

The rear wheel assembly 14 generally includes a motor propelled steerable rear wheel 22 which is centrally positioned along a longitudinal axis of the frame 12 and steerable about an upright axis of steering tube 54 in a manner described in the '636 referenced patent. A first drive means 52 is operably connected to the rear wheel 22 for propelling the vehicle, again as described in the '636 referenced patent. A second drive means (not shown) beneath protective plastic cover 56 is also provided to control the steering orientation of the rear drive wheel 22 about its upright axis 54. Again, the details of this second drive means for controlled steering orientation of the rear wheel 22 are described in detail in the '636 referenced patent. A control housing 46 protectively houses the electronic controls of the device as described in the '636 referenced patent.

The present invention 10 includes an additional motor means 40 which powers a hydraulic actuator (not shown) for elevating and lowering seat 16 in the direction of arrow A so that a user may conveniently be elevated as desired to accommodate a reaching situation or higher countertops or tables.

Figure 3:
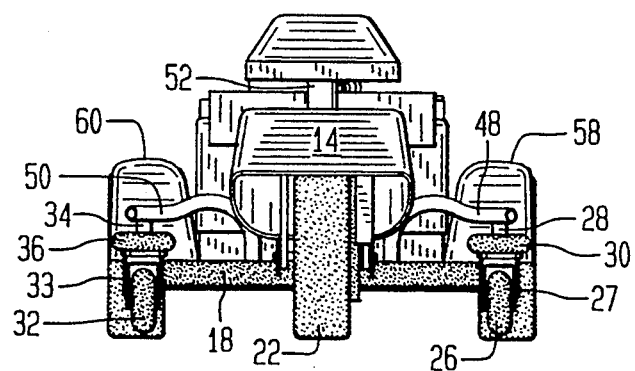
FIG. 3 is a rear elevation view of FIG. 2.
Figure 4:
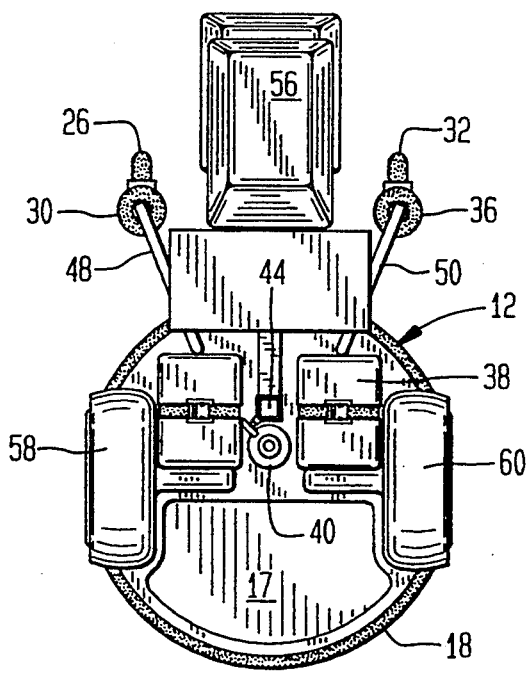
FIG. 4 is a top plan view of FIG. 2.

To help prevent excess tipping of the device 10 during sharp, rapid cornering maneuvers, a pair of anti-tip wheels 26 and 32 are mounted for free rotation within caster housings 27 and 33, respectively as best seen in FIG. 3. These caster housings 27 and 33 are in turn mounted for free rotation about an upright axis in support tubes 28 and 34 which are rigidly connected and downwardly extending from support arms 48 and 50, respectively. These support arms 48 and 50 are rigidly connected in evenly spaced relationship to frame 12.

The anti-tip wheels 26 and 32 are positioned slightly above the support surface atop which the vehicle 10 is resting in its static position. The clearance between the support surface and the anti-tip wheels 26 and 32 is provided so that they only come in contact with the support surface when the vehicle 10 begins to lean laterally in one direction or the other as during a sharp cornering maneuver. Otherwise, during normal operation, these anti-tip wheels 26 and 32 are not in contact with a support surface and do not interfere with the maneuverability of the vehicle 10.

Anti-scuff rollers 30 and 36 are connected on support shafts 28 and 34 immediately above caster housings 27 and 33 as best seen in FIG. 3. These anti-scuff rollers 30 and 36 are freely rotatable about support shafts 28 and 34 and are provided to prevent the rear steering assembly 14 from contacting an upright wall surface when the lateral perimeter of frame 12 or front wheels 20 encounter a wall surface.

Figure 5:
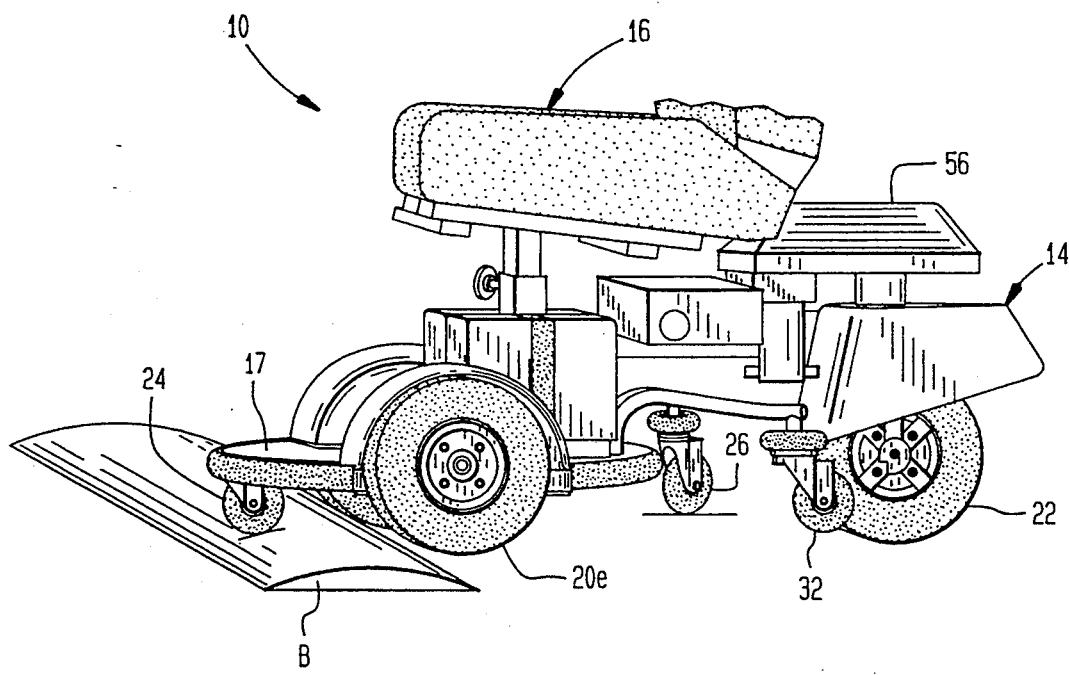
FIG. 5 is a left side elevation view of the invention shown in FIG. 1 as the vehicle approaches a ramp.
Figure 6:
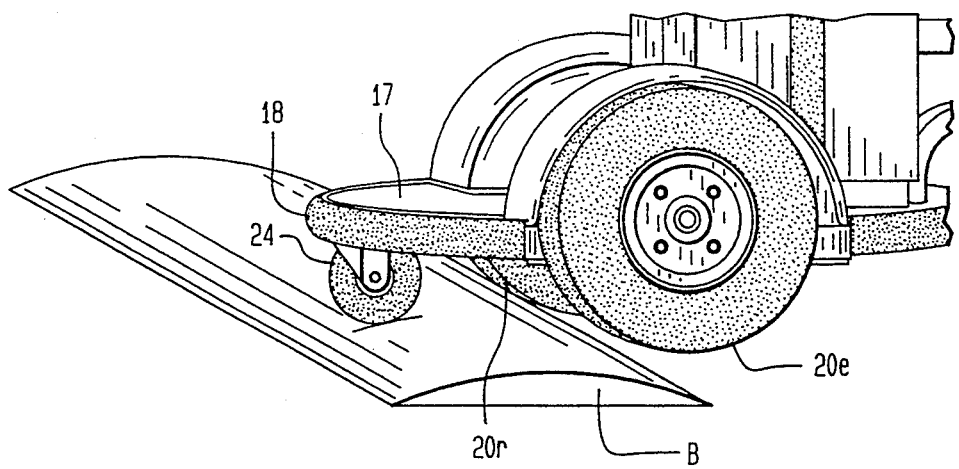
FIG. 6 is an enlarged view of FIG. 5.

As best seen in FIGS. 1, 2, 5 and 6, the invention 10 also includes a ramp assist wheel 24 which is centrally mounted within a support yoke immediately beneath the forwardly foot platform area 17 of frame 12. This ramp assist wheel 24 is freely rotatable about a transverse axis and is provided as best seen in FIGS. 5 and 6 to prevent the forwardly perimeter of frame 12 from scraping or jamming into a ramp, curve or bump which the vehicle typically may encounter in an outdoor setting. On a flat support surface, the ramp assist wheel 24 is positioned slightly thereabove so as not to contact the support surface. However, as seen in FIGS. 5 and 6, as the vehicle 10 approaches a ramp area B, the ramp assist wheel 24 raises the front portion of the frame 12 to prevent contact or damage of the frame with the ramp B. In such circumstance, for example, the left wheel 20l is raised from the support surface while the right wheel 20r remains in contact therewith. The corresponding right anti-tip wheel 26 will also contact the support surface while the left anti-tip wheel 32 will be raised further above the support surface.

Again, by this arrangement of ramp assist wheel 24, any scraping or jamming of the front perimeter area of the frame 12 with ramps, bumps, curbs or the like is prevented. Only a very large curbs are not able to be negotiated by this arrangement, the large curbs having a height greater than the height of the lower surface of frame 12 from the support surface.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A self-propelled personal mobility vehicle for transporting a person comprising:

a generally flat frame supported generally horizontally above the ground by a rear wheel steerable about a generally upright axis and two spaced front wheels;

said rear wheel positioned along a central longitudinal axis of and rearwardly of said frame;

first drive means operably connected to said rear wheel for propelling said vehicle;

second drive means operably connected between said frame and said rear wheel for controlledly rotationally positioning said rear wheel about said upright axis;

a seat connected to and upwardly extending from said frame;

control means including a hand-actuated lever supported on said seat for selectively controlling the rotational speed of said first drive means and the rotational steering positioning of said rear wheel by selective activation of said second drive means;

a stored source of electronic power mounted on said frame and operably connected between said control means and said first and second drive means;

said frame having a cushioning ring connected around and radially extending from a perimeter of said frame;

said front wheels being spaced apart along a common transverse axis and positioned in close proximity to the perimeter of said frame;

an anti-tip wheel connected on each side of said frame between each said front wheel and said rear wheel and extending outwardly from the perimeter of said frame;

each said anti-tip wheel positioned vertically just above a support surface of said vehicle whereby one said anti-tip wheel will contact the support surface when said frame is tilted laterally from an at-rest generally horizontal position above the support surface.

2. A personal mobility vehicle as set forth in claim 1, further comprising:

a cushioned anti-scuff wheel connected on each side of said frame and held for rotation about an upright axis above each said anti-tip wheel;

each said anti-scuff wheel positioned radially outwardly from the perimeter of said frame and rearwardly of the widest transverse dimension of said frame whereby said rear wheel will not contact a straight wall surface when said frame and one said anti-scuff wheel are simultaneously in contact with the wall surface.

3. A personal mobility vehicle as set forth in claim 2, further comprising:

an upright freely rotatable ramp assist wheel longitudinally oriented and disposed centrally beneath a forward portion of said frame;

said ramp assist wheel positioned vertically above the support surface whereby said ramp assist wheel will make an initial contact of said vehicle with a ramp or bump of a predetermined minimum height above the support surface as said vehicle is driven over the ramp or bump;

said ramp assist wheel lifting said forward portion of said frame as said ramp assist wheel rolls over the ramp or bump thereby preventing contact of said forward portion of said frame against the ramp or bump.

4. A self-supported personal mobility vehicle for transporting a person comprising:

frame means supported above the ground by a steerable motor driven rear wheel positioned behind said frame means and two spaced apart front wheels for supporting the person in a seat connected to and upwardly extending from said frame means;

first drive means operably connected to said rear wheel for propelling said vehicle;

said drive means operably connected between said frame and said rear wheel for controlledly rotationally positioning said rear wheel about said upright axis;

cushioning ring means connected to said frame means and extending radially from a perimeter of said frame means for contacting fixed objects such as walls and doorways;

control means including a hand-actuated lever supported on said seat for selectively controlling the rotational speed of said first drive means and the rotational steering positioning of said rear wheel by selective activation of said second drive means;

battery means operably connected between said control means and said first and second drive means;

said front wheels being spaced apart along a common transverse axis and positioned in close proximity to the perimeter of said frame;

an anti-tip wheel connected on each side of said frame between each said front wheel and said rear wheel and extending outwardly from the perimeter of said frame;

each said anti-tip wheel positioned vertically just above a support surface of said vehicle whereby one said anti-tip wheel will contact the support surface when said frame is tilted laterally from an at-rest generally horizontal position above the support surface.

5. A personal mobility vehicle as set forth in claim 4, further comprising:

a cushioned anti-scuff wheel connected on each side of said frame and held for rotation about an upright axis above each said anti-tip wheel;

each said anti-scuff wheel positioned radially outwardly from the perimeter of said frame and rearwardly of the widest transverse dimension of said frame whereby said rear wheel will not contact a straight wall surface when said frame and one said anti-scuff wheel are simultaneously in contact with the wall surface.

6. A personal mobility vehicle as set forth in claim 5, further comprising:

an upright freely rotatable ramp assist wheel longitudinally oriented and disposed centrally beneath a forward portion of said frame;

said ramp assist wheel positioned vertically above the support surface whereby said ramp assist wheel will make an initial contact of said vehicle with a ramp or bump of a predetermined minimum height above the support surface as said vehicle is driven over the ramp or bump;

said ramp assist wheel lifting said forward portion of said frame as said ramp assist wheel rolls over the ramp or bump thereby preventing contact of said forward portion of said frame against the ramp or bump.

* * * * *